March 7, 1961
G. R. NELSON
2,973,676
SLIDING PISTON-TYPE FLUID MOTOR-OPERATED
NUT RUNNING TOOL
Filed July 31, 1958
2 Sheets-Sheet 1
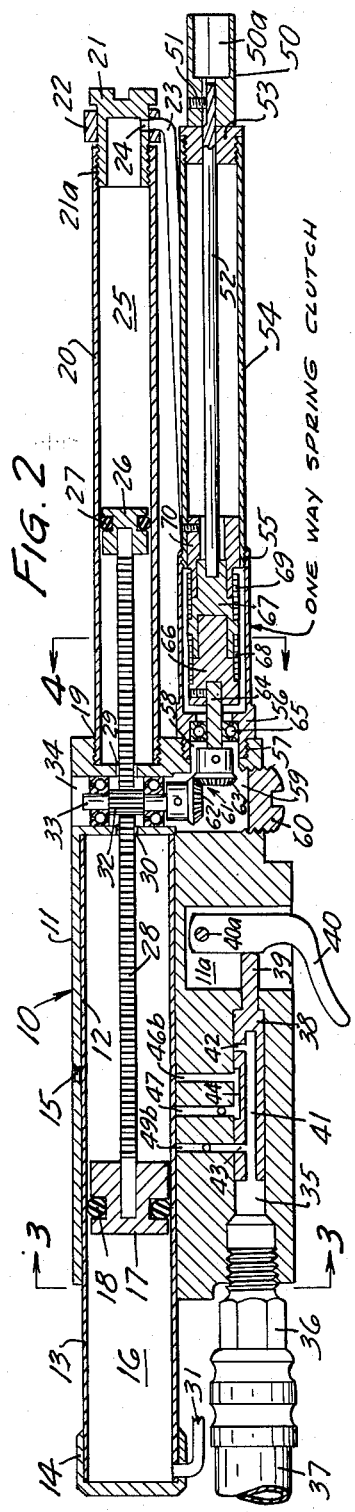
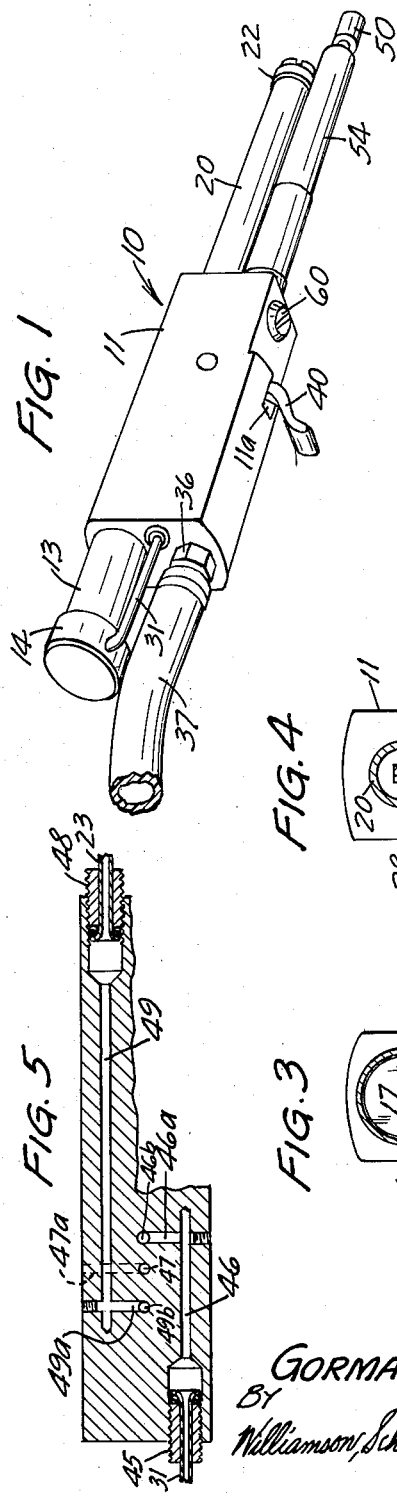
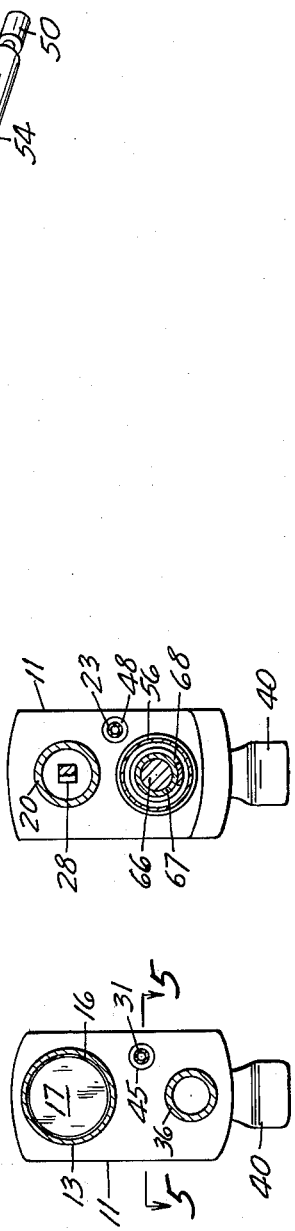
INVENTOR
GORMAN R. NELSON
BY
Williamson, Schroeder & Palmatier
ATTORNEYS

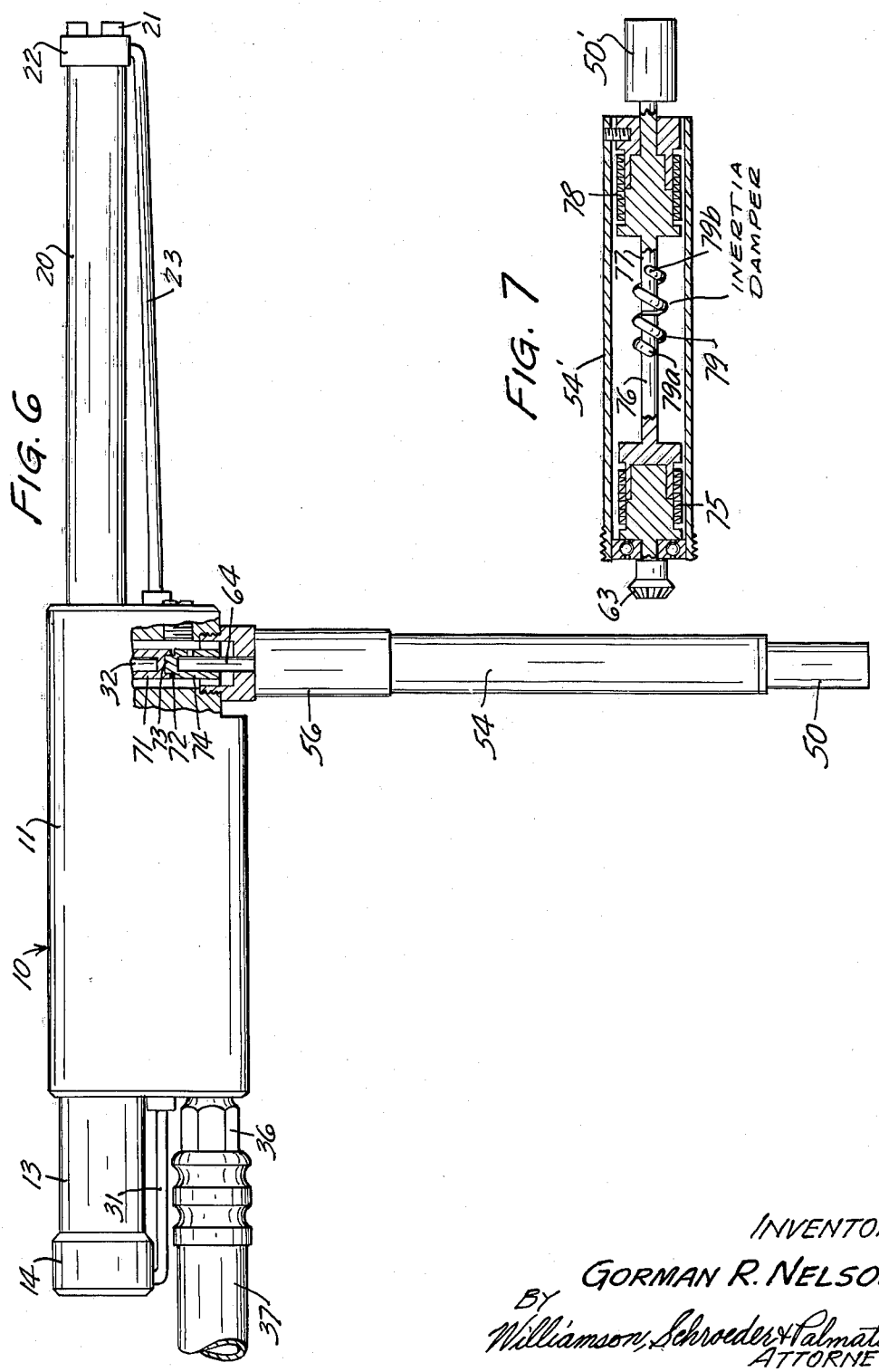

United States Patent Office 2,973,676
Patented Mar. 7, 1961

2,973,676

SLIDING PISTON-TYPE FLUID MOTOR-OPERATED NUT RUNNING TOOL

Gorman R. Nelson, Sioux Falls, S. Dak.
(Canyon Lake Heights, Rapid City, S. Dak.)

Filed July 31, 1958, Ser. No. 752,358

8 Claims. (Cl. 81—52.4)

This invention relates to power driven tools and more specifically relates to a power tool for use in manufacturing operations or the like wherein nuts and the like must be turned and seated with a predetermined seating torque.

Air motors have been previously used for nut running, but in the past, only rotary air motors have been used in this capacity. In running nuts, it is important that they be properly torqued when seated. The internal inertia of the rotary motor is high and its velocity is also high. Therefore when a nut is seated, the impact torque is very high and erratic. It will be understood that this torque is a function of the moment of inertia and the deceleration of the nut or screw. Since both of these factors are high when a conventional air motor is employed for running the nut, the impact torque is high. It will therefore be seen that the seating torque of the nut or screw cannot be measured by the stall torque of the motor, but on the other hand the seating torque is actually the impact torque previously mentioned. It should further be noted that the very nature of design of a rotary air motor does not give it a constant stall torque. With these comments in mind it is to the elimination of these and other disadvantages in a power tool for running nuts that the present invention is directed, along with the further provision of other novel and desirable features.

An object of my invention is to provide a new and improved air driven nut running tool which is of relatively simple and inexpensive construction and operation.

Another object of my invention is to provide an air-operated tool for running nuts and the like wherein the seating torque applied on the nut or screw may be carefully controlled by varying the magnitude of the air pressure applied to the tool.

Another object of my invention is the provision of an improved tool for running nuts and the like which substantially eliminates the impact effect upon the seating torque of the nut or screw and therefore permits the seating torque of the nut to be carefully controlled.

A further object of my invention is to provide a novel air-operated power tool for running nuts and the like which makes extremely economical use of air and prevents any air from being wasted.

A still further object of my invention is the provision of an improved air-operated power tool for running nuts and the like and for preventing any reverse turning or reverse torque from being exerted against the nut after the same is seated.

These and other objects and advantages of my invention will more fully appear from the following description made in connection with the accompanying drawings wherein like reference characters refer to the same or similar parts throughout the several views and in which:

Fig. 1 is a perspective view of the invention;
Fig. 2 is a longitudinal section view taken on a substantially vertical plane through the tool;

Fig. 3 is a detail transverse section taken on a vertical plane as indicated at 3—3 in Fig. 2;
Fig. 4 is a detail transverse section view taken on a plane as indicated at 4—4 in Fig. 2;
Fig. 5 is a detail section view, partly broken away and taken on a substantially horizontal plane as indicated at 5—5 in Fig. 3;
Fig. 6 is a side elevation view of the air-operated nut running tool and shown with the driving member oriented in a different position as compared to that shown in Fig. 2 and having a portion of the body member shown in section for clarity of detail; and
Fig. 7 is a longitudinal detail section view of a modified form of a portion of the mechanism which may be substituted for the output power transmitting mechanism driven by bevel gear 62 in Fig. 2.

The nut running tool is indicated in general by numeral 10 and includes a body member 11 which is generally elongate in shape and is of such a size as to be easily held in a person's hand. The body member 11 has an elongate opening 12 at the rear end thereof and a tube 13 with a cap 14 on the outer end thereof is secured in the opening 12 by any suitable means such as a set screw 15. The tube 13 defines an air cylinder 16 in the outer end thereof and carries a reciprocable piston 17 sealed as by an O-ring 18 to the internal peripheral wall of the tube.

A second tapped opening 19 is formed in the other end of the body member in alignment with the opening 12 and a tube 20 which is substantially smaller in diameter than tube 13, is threaded into the opening 19. The tube 20 has an end cap 21 threaded at 21a into the outer end thereof and the cap 21 retains a ring 22 against the end of tube 20 which mounts the end of an air conduit 23 for alignment with the air port 24 in the cap 21 for injecting air and releasing air from the cylinder 25 defined by the tube 20. A piston 26 is slidable in the cylinder 25 and is sealed to the wall as by O-ring 27. The pistons 26 and 17 are secured together by means of a rack 28 which extends through guide apertures 29 and 30 at the inner ends of openings 19 and 12 in the body member 11.

An air conduit 31 is connected in the cap 14 for communication with the interior of cylinder 16.

The rack 28 is in meshed relation with a pinion 32 which is affixed to a shaft 33. The shaft and pinion are mounted in an opening 34 between the cylinders.

Means are provided for controlling the application and release of air in the cylinders 16 and 25, and in the form shown, such means include a valve port 35 in the body member 11 and opening through the rear end thereof to permit attachment of a fitting 36, to which is secured the air hose 37. A slidable valve element 38 is disposed in the opening 35 and has a control finger 39 projecting forwardly against a trigger 40 which is swingably mounted on a pin 40a in a recess 11a in the lower side of the body member 11. The valve element 38 has an elongate port 41 extending longitudinally through the rear portion thereof and has a pair of transverse ports 42 and 43 communicating with the longitudinal port 41. The valve element 38 also has an elongate recess 44 in the side thereof.

The air conduit 31 connected with cylinder 16 is secured to the body member by means of a fitting 45 and the body member 11 has an air port 46 extending longitudinally therethrough and then transversely at 46a and then vertically at 46b for communicating with the recess 44 of valve element 38 when the valve element is in its normal forward position. An air discharge port 47 is also provided in the body member for communication with the recess 44 when the valve element 38 is in its forwardly shifted position, and the air discharge port 47 discharges out through the side of the body member at 47a. The air conduit 23 is connected to the body member by means of a fitting 48 and is in communication with an air port 49 which extends longitudinally through the body member and then transversely therethrough at 49a and then vertically at 49b for communication with the port 43 in the valve element 38 when the valve element is in its forwardly shifted position. It will be noted that when the trigger 40 is operated by urging upwardly and rearwardly, the valve element 38 is shifted rearwardly so as to align the port 42 of the valve element with the air port 46b so as to apply air pressure through the conduit 31 into the drive cylinder 16 for moving the piston 17. When the valve element 38 is shifted rearwardly, the air port 49b is also in communication with the recess 44 and air discharge port 47 to allow the air in the cylinder 25 and conduit 23 to be released.

The nut running tool includes a driving member 50 which has a socket 50a formed in the end thereof for receiving an adapter for applying a nut or bolt head to the driving member, or on the alternative, if the nut or bolt head is of proper size, the drive member 50 may be applied directly to the bolt head or nut. The drive member 50 is affixed as by a set screw 51 to an elongate rotary shaft 52 which is journalled in a bearing 53. The bearing 53 is carried in a housing or tube 54 which is threadedly secured at 55 to a tubular mounting 56 which is threaded at 57 into an opening 58 in the housing 11 and oriented longitudinally thereof. The opening 58 communicates with a second opening 59 which is oriented transversely to the opening 58 in the bottom of the housing and shown in Fig. 2 with a plug 60 threaded therein.

Rotary power transmitting means are provided for connecting the shaft 33 with the rotary driving shaft 52 and in the form shown, such means include a coupling apparatus 61 which includes a pair of bevel gears 62 and 63 which are meshed with each other. The bevel gear 62 is affixed as by set screw to the shaft 33 and the bevel gear 63 is affixed as by set screw to a driven shaft 64 which is journalled in a bearing 65 in the adapter 56.

Between shaft 64 and shaft 52 is provided a unidirectional driving mechanism so as to cause transmission of rotary power to the shaft 52 only when the pinion 32 is revolved in a predetermined direction. Shafts 64 and 52 are respectively affixed as by set screws or brazing to a pair of cylindrical end-to-end rotary elements 66 and 67 which are interfitted at their inner ends to be rotatable with respect to each other. The cylindrical outer surfaces thereof are aligned with each other and a coil spring 68 extends along both the elements 67 and 66 and it encompasses the outer surfaces of these elements in close-fitting relation. The spring 68 does not normally exert any pressure on the elements 66 and 67. The spring 68 is constructed of spring steel wire which is substantially square in cross section and therefore a maximum of surface area of the spring is in engagement with the cylindrical surfaces of elements 66 and 67. The spring 68 as viewed from the end adjacent the bevel gears 62 and 63, is wound in a left hand direction and therefore, when shaft 64 is revolved in a counter-clockwise direction, the spring 68 will slip with respect to element 67 and allow the element 66 to revolve while element 67 and the drive member 50 remain stationary. When the shaft 64 is revolved in a clockwise direction, as viewed from the bevel gears, the spring 68 tightens onto the cylindrical outer surfaces of elements 66 and 67 and causes rotary power transmission therethrough to the shaft 52 and driving member 50.

A similar unidirectional driving spring 69 is wrapped around the forward end of element 67 and is also wrapped around a bushing 70 which is affixed as by set screw to the housing or tube 54 so as to prevent reverse turning of the shaft 52 and drive member 50. As viewed from the bevel gears, the spring 69 is wound in a right hand direction and therefore, when the element 67 is rotated in a clockwise direction, the spring 69 slips to permit the element 67 to freely revolve with respect to the bushing 70 so as to revolve the shaft 52 and drive member 50. When any turning force is exerted on the element 67, tending to rotate it in a counterclockwise direction, the spring 69 tightens on the cylindrical surfaces of elements 67 and 70 to prevent any rotation of the element 67 whatsoever and therefore, the shaft 52 and drive member 50 is precluded from rotating in a counterclockwise direction.

As best seen in Fig. 6, the housing 54 and adapter 56 and drive member 50 may be secured to the housing at the threaded port 59 so as to cause the drive member to be oriented at one side of the tool 10, instead of at the end thereof. A coupling sleeve 71 is keyed or otherwise affixed to the pinion shaft 32 and has a coupling socket 72 in the outer end thereof. A male coupling 73 is inserted in the socket 72 and is mounted on a sleeve 74 which is affixed as by set screws to the shaft 64 in the adapter housing 56.

It will therefore be seen that the housing 54 and drive member 50 may be interchangeably positioned at a position transversely outwardly from the body member 11 or in longitudinal relation therewith at the forward end.

The modified form of the invention shown in Fig. 7 is substantially similar to a form shown in Fig. 2 and includes in a housing 54' securable to the body member 11, a unidirectional power-transmitting mechanism 75 for connecting the bevel gear 63 to a shaft 76. Another shaft 77 disposed in end-to-end alignment with the shaft 76 is connected by means of unidirectional power transmitting mechanism 78 to the drive member 50'. An inertia damping device comprising a coil spring 79 is provided for interconnecting the shafts 76 and 77. One end 79a of the coil spring 79 is affixed to the shaft 76 and the other end 79b thereof is affixed to the shaft 77. The spring 79 is of a rather heavy and stiff nature so as to normally transmit all of the power from the bevel gear 63 to the drive member 50', but when the nut or bolt being turned seats, the inertia damper will absorb the inertia from the air motor as the air motor is stopped and this impact torque is not applied to the nut or screws being turned.

In operation, the tool 10 is connected to the air line 37 and air under pressure is normally applied through the port 43 and valve 38 into the cylinder 25 for returning the piston 17 to its rearmost location.

The adapter or attachment to the nut may be applied to the drive member 50 and when the adapter is also applied to the nut, the trigger 40 will be swung rearwardly so as to move the valve rearwardly and thereby align the port 42 with the port 46b and align the port 49b with the recess 44. Air will be released from the cylinder 25, the air under pressure is applied into the cylinder 16 so as to drive the piston 17 forwardly, causing the rack 28 to be driven forwardly for rotating the pinion 32. As the pinion 32 is revolved, the bevel gears 62 and 63 transmit the rotary power to the element 66, which when turned in the clockwise direction, will transmit rotary power through the spring 68 to the element 67 for driving the shaft 52 and turning the nut or screw. It has been found that ordinarily, eight revolutions of the screw or nut is sufficient to seat it and the length of the rack 28 and size of the pinion 32 is such as to produce approximately eight revolutions of the driving member 50 each time the piston 17 is operated.

It will be noted that although the piston 17 may move quickly, the inertia thereof is relatively small and the rotary speed of the drive member 50 does not approximate the normal rotational speeds of conventional air motors and therefore the deceleration of the nut or screw when it is seated is a relatively low value and the inertia of the mechanism is also relatively low and therefore the seating torque applied to the nut or screw will be relatively low. Therefore, the torque applied to the nut or screw can be accurately controlled. The air pressure applied to the piston 17 is transmitted directly to the nut and by varying the air pressure applied in the cylinder 16, the torque applied to the nut or screw at seating may be accurately predetermined.

In the form of the invention shown in Fig. 7, the inertia damping spring 79 may flex slightly when the nut or screw is seated and when the drive member 50' is stopped and the spring will thereby absorb any impact which may be normally transmitted.

It will, of course, be understood that various changes may be made in the form, detail, arrangement and proportion of the parts without departing from the scope of my invention which consists of the matter described herein and set forth in the appended claims.

What I claim is:

1. A nut running tool comprising a body member having an air cylinder, a piston mounted in the cylinder for forward and rearward movement and having a rack secured thereto for sliding movement with the piston, said piston moving forwardly upon application of air in the cylinder, a pinion journalled in the body member and meshed with the rack, controllable means operable to alternately produce rearward movement of the piston and permit substantially unobstructed forward movement of the piston, a multi-positioned trigger-operated means controlling application and release of air pressure in the cylinder and also operating said controllable means, said trigger-operated means in one position applying air pressure in the cylinder to produce forward movement of the piston and also operating said controllable means to permit unobstructed forward movement of the piston, and said trigger-operated means in another position, operating said controllable means to produce rearward movement of the piston and also releasing air pressure from the cylinder to permit unobstructed rearward movement of the piston, a rotary driving member for turning nuts and the like, means mounting the driving member on the body member, and rotary power transmitting means connecting the pinion to the driving member, whereby to turn the driving member through a predetermined arc and to seat the nut with a predetermined seating torque which may be controlled by the air pressure.

2. A nut running tool comprising a body member, a sliding, double-acting air motor on the body member and including a piston and a slidable rack secured to the piston, a pinion journalled in the body member and meshed with the rack, means controlling application and release of air pressure in the motor for controlling movement of the motor in both directions and also controlling forth and back movement of the rack, a rotary driving member for turning nuts and the like, means mounting the driving means on the body member, and rotary power transmitting means connecting the pinion to the driving member, whereby to turn the driving member through a predetermined arc and to seat the nut with a predetermined seating torque which may be controlled by the air pressure.

3. A nut running tool comprising a body member having an air cylinder, a piston in the cylinder, means controlling application and release of air pressure in the cylinder for operating the piston and moving the same in a first rectilinear direction, means returning the piston in a second rectilinear direction when the pressure in the cylinder is released, a rotary driving member for turning nuts and the like, means mounting the driving member on the body member, and motion converting and power transmitting mechanism connected with the piston and connected with the driving member for rotating the driving member when the piston is shifted, said mechanism including a one-way driving clutch apparatus having a rotary output element connected to the driving member, said apparatus rotating said rotary element and said driving member in a first rotary direction when the piston is moved in said first rectilinear direction and said apparatus permitting said rotary element and said driving member to remain stationary when said piston is moved in said second rectilinear direction and a one-way braking clutch apparatus connecting said rotary output element with the body member permitting rotation of said element in said first rotary direction and preventing rotation of said element in said second rotary direction, whereby to turn the driving member through a predetermined arc and to seat the nut with a predetermined seating torque which may be controlled by the air pressure.

4. A nut running tool comprising a body member having an air cylinder, a piston in the cylinder and having a rack secured thereto for sliding movement with the piston, a pinion journalled in the body member and meshed with the rack, means controlling application and release of air pressure in the cylinder for operating the piston, means returning the piston when the pressure in the cylinder is released, a rotary driving member for turning nuts and the like, means mounting the driving member on the body, rotary power transmitting means connecting the pinion to the driving member and including a unidirectional drive mechanism transmitting rotary motion in a first direction to the driving member and preventing transmission of rotary movement in a second direction, opposite to said first direction, to said driving member, whereby to apply torque to the driving member in only one direction to assure seating of the nuts at a predetermined torque.

5. A nut running tool comprising a body member having an air cylinder, a piston in the cylinder and having a rack secured thereto for sliding movement with the piston, a pinion journalled in the body member and meshed with the rack, means controlling application and release of air pressure in the cylinder and for operating the piston, means returning the piston when the pressure in the cylinder is released, a rotary driving member for turning nuts and the like, means mounting the driving member on the body, a rotary power transmitting means connecting the pinion to the driving member and including a unidirectional drive mechanism controlling the rotary movement of the driving member and said unidirectional driving mechanism includes a pair of cylindrical end-to-end rotary elements, one driven from the pinion and the other driving the driving member, said elements being rotatable with respect to each other, and a coil spring extending along both of said rotary elements and encompassing said elements in close-fitting relation, whereby to transmit power from the pinion to the driving member when the pinion is turned in one direction and to allow the driving member to remain stationary when the pinion is turned in the other direction.

6. A nut running tool comprising a body member, a pair of air cylinders aligned with each other and having adjacent inner ends and having closed outer ends, a pair of pistons each in a respective cylinder and slidable therein, one cylinder and the corresponding piston being of larger diameter than the other cylinder and piston, the larger piston comprising a drive piston and the smaller piston comprising a return piston, a rack connected to said pistons to be moved thereby, air conduits connected with the outer ends of said cylinders, valve means connected with said conduits for alternately applying and releasing air pressure in the cylinders to cause movement of said rack, a pinion journalled in the body member and meshed with the rack, a rotary driving member for turning nuts and the like, means mounting the driving member on the body, and rotary power transmitting means connectig the pinion to the driving member, whereby all of the power of the drive piston is transmitted to the drive member and the return piston will move the drive piston back to starting position.

7. A nut running tool comprising an elongate body member having an air cylinder, a piston in the cylinder and having a rack secured thereto for sliding movement, a pinion journalled in the body member and meshed with the rack, means controlling application and release of air pressure in the cylinder for operating the piston, means returning the piston when the pressure in the cylinder is released, a pair of openings in the body member adjacent the pinion, one of said openings being oriented in alignment with the pinion rotation axis and the other opening being oriented transverse to the pinion rotation axis, a shaft on the pinion extending into proximity with said openings, an elongate housing removably secured in one of said openings and interchangeably securable in the other of said openings, a drive member journalled in said housing, and coupling means connecting the shaft to the drive member, whereby to permit positioning of the drive member in a preselected position with respect to the elongate body member and air cylinder.

8. A nut running tool comprising a body member having an air cylinder, a piston in the cylinder and having a rack secured thereto for sliding movement, a pinion journalled in the body member and meshed with the rack, means controlling application and release of air pressure in the air cylinder for operating the piston, means returning the piston when the pressure in the cylinder is released, a rotary driving member for turning nuts and the like, means mounting the driving member on the body member, and rotary power transmitting means connecting the pinion to the driving member and including a rotational inertia damper interposed between the pinion and the driving member for absorbing impact torque when the nut is seated.

References Cited in the file of this patent
UNITED STATES PATENTS

| | | |
|---|---|---|
| 1,954,620 | Connell | Apr. 10, 1934 |
| 2,250,736 | Torresen | July 29, 1941 |
| 2,293,786 | Worden | Aug. 25, 1942 |
| 2,691,314 | Stevens et al. | Oct. 12, 1954 |
| 2,752,808 | Reynolds | July 3, 1956 |
| 2,780,950 | Province | Feb. 12, 1957 |
| 2,786,379 | Blackington | Mar. 26, 1957 |
| 2,816,468 | Lawrenow | Dec. 17, 1957 |
| 2,836,090 | Ray | May 27, 1958 |
| 2,878,700 | Reynolds | Mar. 24, 1959 |

UNITED STATES PATENT OFFICE
CERTIFICATION OF CORRECTION

Patent No. 2,973,676            March 7, 1961

Gorman R. Nelson

It is hereby certified that error appears in the above numbered patent requiring correction and that the said Letters Patent should read as corrected below.

Column 5, line 54, for "means on" read -- member on --.

Signed and sealed this 5th day of September 1961.

(SEAL)
Attest:

ERNEST W. SWIDER            DAVID L. LADD

Attesting Officer            Commissioner of Patents